United States Patent [19]
Glance et al.

[11] Patent Number: 5,455,699
[45] Date of Patent: Oct. 3, 1995

[54] LARGE CAPACITY MULTI-ACCESS WAVELENGTH DIVISION MULTIPLEXING PACKET NETWORK

[75] Inventors: Bernard Glance, Colts Neck; Mark J. Karol, Fair Haven, both of N.J.

[73] Assignee: AT&T Corp., Murray Hill, N.J.

[21] Appl. No.: 171,127

[22] Filed: Dec. 21, 1993

[51] Int. Cl.$^6$ ..................................................... H04J 14/02
[52] U.S. Cl. ........................... 359/125; 359/124; 359/128
[58] Field of Search ........................... 359/117–118, 124, 359/128, 139, 125; 385/16, 24; 372/20; 370/60

[56] References Cited

U.S. PATENT DOCUMENTS

| | | | |
|---|---|---|---|
| 5,101,290 | 3/1992 | Eng et al. | 359/123 |
| 5,303,078 | 4/1994 | Brackett et al. | 359/123 |

OTHER PUBLICATIONS

C. A. Brackett, "Dense Wavelength Division Multiplexing Networks: Principle and Applications", IEEE Journal on Selected Areas in Communications, vol. 8, No. 6, Aug., 1990, pp. 948–964.
A. A. M. Saleh, "Optical WDM Technology for Networking and Switching Applications", OFC '92 Technical Digest, Feb. 2–7, 1992, San Jose; Calif., p. 199.
C. Dragone, C. A. Edwards, R. C. Kistler, "Integrated Optics N×N Multiplexer on Silicon", IEEE Photonics Technology Letters, vol. 3, No. 10, Oct., 1991, pp. 896–899.
E. Arthurs et al., "Multiwavelength Optical Crossconnect for Parallel–Processing Computers", Electronics Letters, vol. 24, No. 2, Jan., 1988, pp. 119–120.
E. Arthurs, M. S. Goodman, H. Kobrinski, and M. P. Vecchi, "HYPASS: An Optoelectronic Hybrid Packet–Switching System", IEEE Journal on Selected Areas in Communications, vol. 6, No. 9, Dec. 1988, pp. 1500–1510.
B. Glance, "Protection–Against–Collision Optical Packet Network", Journal of Lightware Technology, vol. 10, No. 9, Sep, 1992, pp. 1323–1328.
B. Glance, U. Koren, R. W. Wilson, D. Chen, A. Jourdan, "Fast Optical Packet Switching Based on WDM", IEEE Photonics Technology Letters, vol. 4, No. 14, Oct. 1992, pp. 1186–1188.
M. Zirngibl, C. Dragone, C. H. Joyner, "Demonstration of A 15×15 Arrayed Waveguide Multiplexer on InP", IEEE Photonics Technology Letters, vol: 4, No. 11, Nov. 1992, pp. 1250–1253.
M. J. Karol, M. G. Hluchyj, S. P. Mortan, "Input vs. Output Quequeing on a Space Division Packet Switch", IEEE Transactions on Communications, vol. Com–35, No. 12, Dec., 1987, pp. 1347–1356.

*Primary Examiner*—Leo H. Boudreau
*Assistant Examiner*—Kinfe-Michael Negash

[57] ABSTRACT

The present invention relates to an optical communication sytem well suited for local-area-network and optical switching applications requiring high bit rate transmission. The system provides collision-free reception, achieved by means of a novel fast-tunable optical filter that controls the packet flow. Reception acknowledgements are passively generated without the use of optical sources and are transported on the same packet network.

14 Claims, 4 Drawing Sheets

5,455,699

LARGE CAPACITY MULTI-ACCESS WAVELENGTH DIVISION MULTIPLEXING PACKET NETWORK

BACKGROUND OF THE INVENTION

1. Field of The Invention

The present invention relates to an optical packet communication sytem well suited for Local-Area-Network (LAN) and optical switching applications requiring high bit rate transmission. The network is capable of providing multi-gigabit-per-second transmission per user, based on wavelength division multiplexing and frequency routing, and permits users to freely transmit their packets, with collision-free reception. Assuming a single transmitter per user, and either one or two receivers per user, the sytem throughput can approach sixty and ninety percent (per wavelength), respectively.

2. Information Disclosure Statement

Wavelength division multiplexing (WDM) and frequency routing provide the means to build large-capacity packet networks that are optically transparent between input and output ports. In these systems, packets are spatially routed according to their wavelength with minimal transmission loss. Such a network can be realized by using wavelength demultiplexers at the input ports, appropriately connected to similar devices at the output ports, as proposed by Brackett, "Dense Wavelength Division Multiplexing Networks: Principle and Applications". Unfortunately, this arrangement requires N×N interconnecting fibers for a system supporting N users. A more practical architecture was recently proposed by Saleh, "Optical WDM Technology for Networking and Switching Applications", based on a compact integrated frequency router invented by Dragone, et al., "Integrated Optics N×N Multiplexer on Silicon". In this case, each user is connected to the network by only a pair of fibers in a star configuration, which is well suited for Local-Area-Network (LAN) and optical switching applications. In addition to their routing properties, such sytems can provide contention-free operation, since packets originating from different sources are received on different wavelengths at a given destination, and thus can be demultiplexed and received independently. Unfortunately, N×N receivers are mainly required for a system serving N users. An architecture using a single receiver per output port is likely to be more economical. This approach, however, requires the use of fast-tunable optical receivers, and also requires that users be informed of their packet status since packets can be rejected by the receiver. Until now, these two problems have not been satisfactorily resolved. Known reported fast-tunable optical receivers have a too-limited tuning range or are too slow. Several attempts have been made for solving the reception acknowledgement problem, all of which use extensive additional optical hardware which considerably complicates the system architecture. These include Arthurs et al., "Multiwavelength Optical Crossconnect for Parallel Processing Computers" and "HYPASS: An Optoelectronic Hybrid Packet-Switching System"; and Glance, "Protection-Against-Collision Optical Packet Network". Therefore, none of the inventions of the prior art disclose a network architecture using fast-tunable lasers as transmitters and a novel fast-tunable optical filter for resolving contention between packets. Furthermore, none of the networks disclose an architecture that is simple in that it involves a single optical receiver per output port.

SUMMARY OF THE INVENTION

This invention pertains to an optical communication sytem well suited for local-area-network (LAN) and optical switching applications requiring high bit rate transmission. The sytem provides collision-free reception, achieved by means of a novel fast-tunable optical filter that controls the packet flow. Reception acknowledgements are passively generated without the use of optical sources and are transported on the same packet network.

BRIEF DESCRIPTION OF THE DRAWINGS

The present invention is more fully understood when the instant specification is taken in conjunction with the drawings which are appended hereto, wherein.

DETAILED DESCRIPTION OF THE INVENTION

Figure 1:
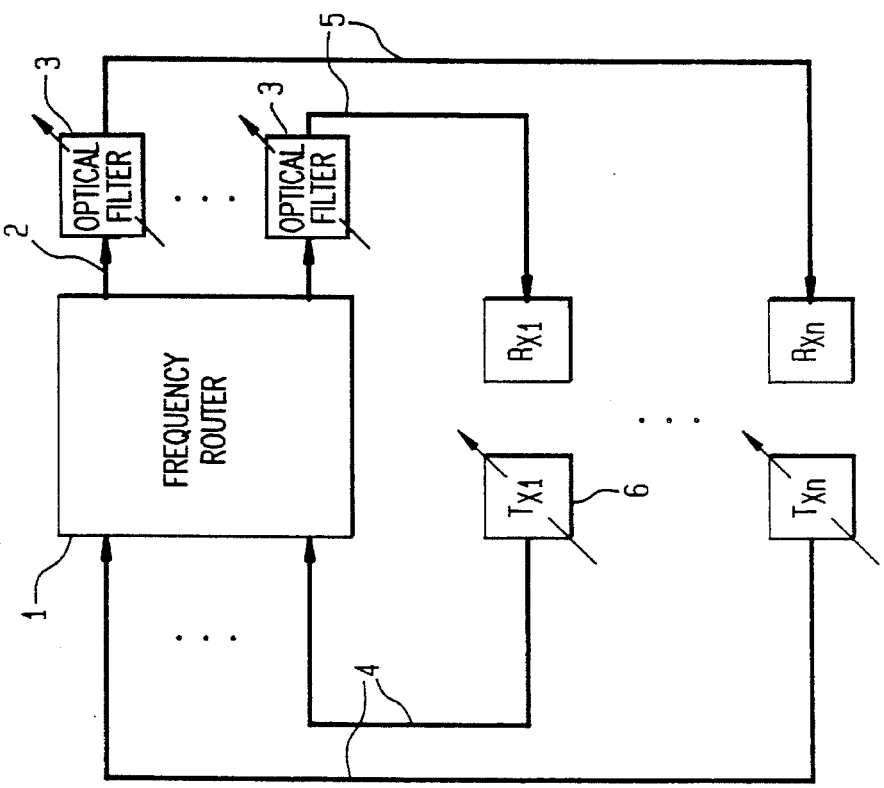
FIG. 1 shows a schematic of the network architecture.

Wavelength Division Multiplexing (WDM) and frequency routing provide the means to build large-capacity packet networks that are optically transparent between input and output ports. Thus, the network architecture of the present invention as depicted in FIG. 1, is built around a central hub consisting of an N×N frequency router 1 followed by a fast-tunable optical filter 3 at each output port 2. Users are connected to the hub by a pair of fibers. One of the fibers is used for transmission 4, the other is used for reception 5. Transmission is done by a fast-tunable laser 6 capable of switching at nanosecond speeds between the N wavelengths of the system. Data are carried by Amplitude Shift Keying (ASK) impressed by an external modulator. At reception, the signal is demodulated by a conventional direct detection receiver.

The packets are routed by the frequency router according to their wavelengths, with each source using a different wavelength to access a given destination. Contention between packets trying to reach the same destination is resolved by allowing one packet at a time to access to the exit fiber. This result is achieved by the fast-tunable optical filters located at the outputs of the frequency router. Those same devices generate the acknowledgement messages, which inform the sources of their packets' reception. The optical filter and the acknowledgement process are herein described.

Figure 2:
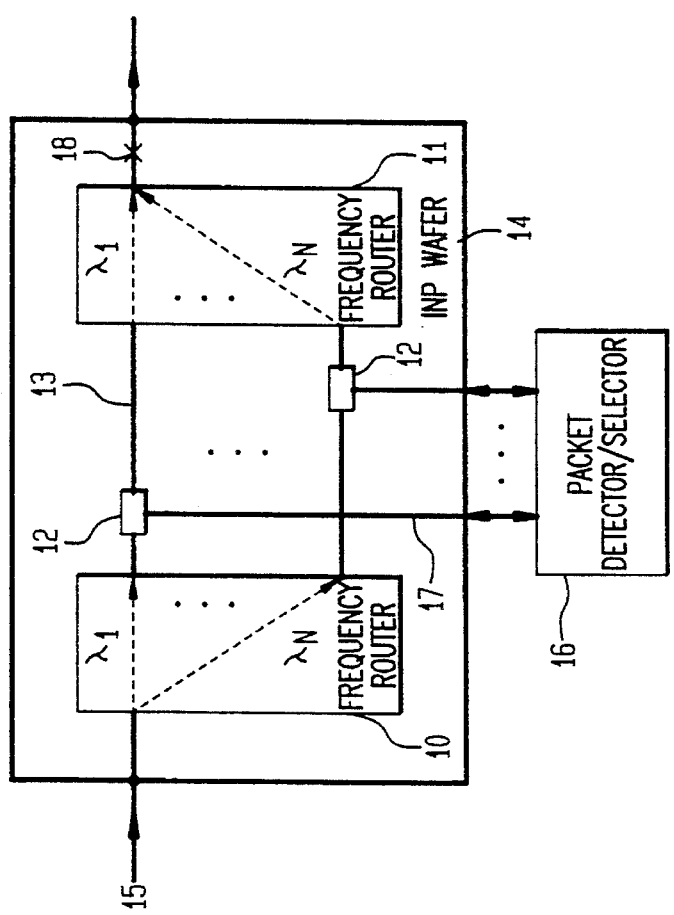
FIG. 2 shows a schematic of the fast tunable optical filter.

The fast tunable optical filter has multi-functions. It detects incoming packets and selects one of them when more than one packet tries to reach the same destination. It then sends a reception acknowledgement back to the source of the selected packet. The circuit for this device is based on two 1×N frequency routers 10 and 11, connected at their N ports as shown in FIG. 2, through active sections 12 of optical waveguide 13. The entire circuit may be integrated on an InP wafer 14. The first frequency router demultiplexes the incoming signal 15, separating simultaneous packets. Packet selection is done by the active sections 12 which play two roles- as packet detector and packet selector 16. Reverse-biased, they act as photodiodes and thus can be used to detect the demultiplexed packets. To enable this process, the packets are preceded by a carrier burst several bits long. Following detection, one of the active sections, having sensed an incoming packet, is made optically transparent by reversing the polarity of its biasing current 17. The selected packet is then directed to the destination fiber by the second frequency router 11. Unselected packets are dissipated by their respective active sections, which are highly lossy in the photodiode mode. Collision between received packets is thus avoided. The selection process is of course simplified when the received signal is composed of a single packet. In this case, only one photocurrent is detected and the corresponding active section is gated. Such a filter can potentially select packets in a few nanoseconds.

Figure 3:
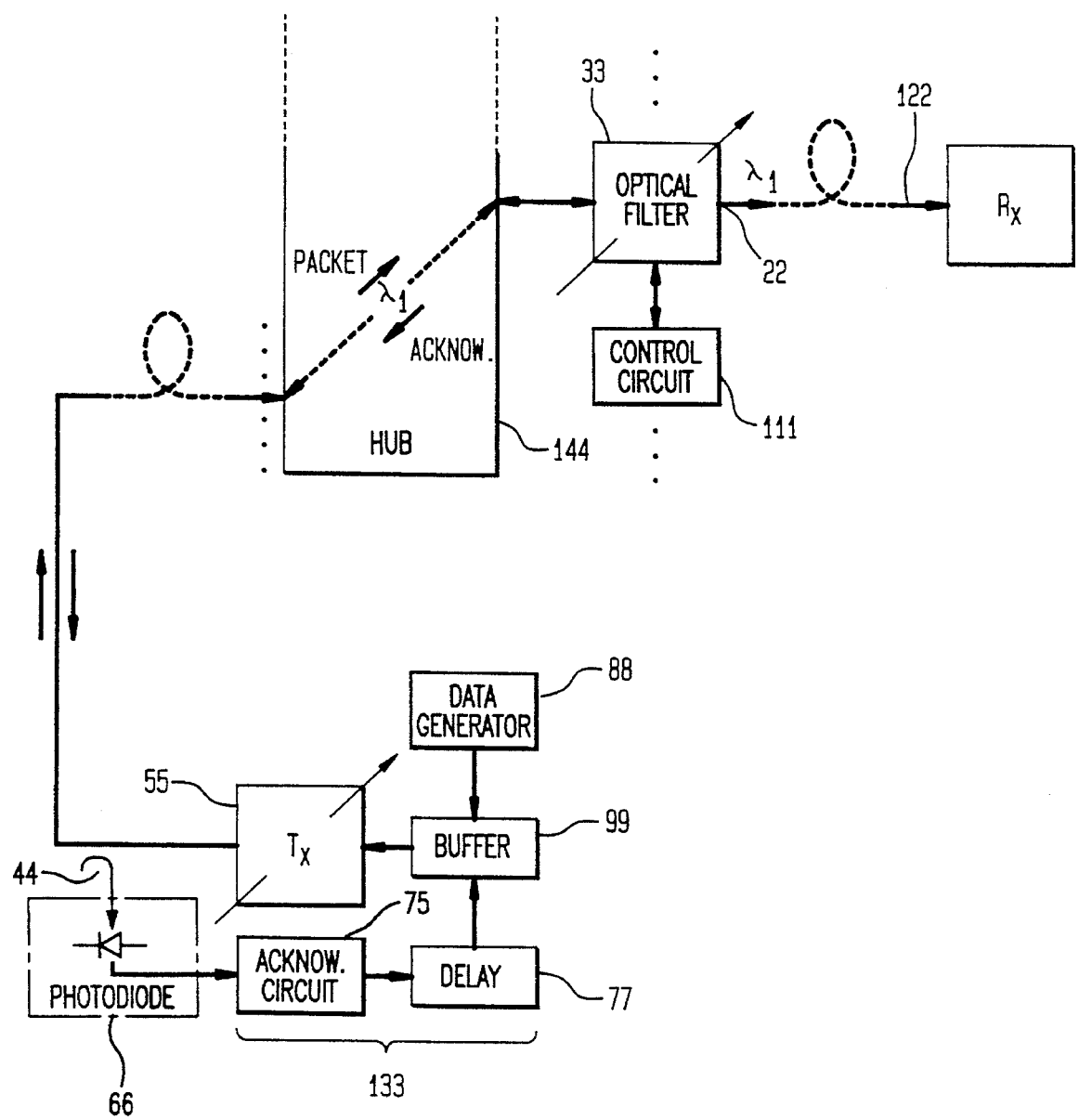
FIG. 3 shows a schematic of the acknowledgement transport.

A fraction of the selected packet is reflected by a discontinuity 18 in the optical filter output waveguide. By transmission reciprocity, this signal flows back to its source to inform it that the packet has been received, it acknowledges receipt. As depicted in FIG. 3, the acknowledgement message is created by reflecting 22, at the output of the tunable optical filter 33, a fraction of the packet selected by control circuit 111. The reflection is achieved by a small optical waveguide discontinuity; by transmission reciprocity, the reflected signal flows back only to its source. Its presence, after an appropriate delay, can thus be used to signal reception 122. To achieve this result, a directional coupler 44 in front of the transmitter 55 diverts a fraction of the reflected signal to a photodiode 66. Packet reception is acknowledged by acknowledge circuit 75 when a photocurrent, measured over a packet duration, is detected one round-trip propagation delay 77, between the source 133 and the central hub 144, after packet transmission. Thus, an advantage of this acknowledgement process is that it requires little additional optical hardware.

The multi-access optical packet can be viewed essentially as a distributed input-queued packet switch. Assuming synchronous, time-slotted operation (synchronized to the central hub), during each time slot, at most one (fixed-length) packet is selected per output. It is assumed that this selection is made randomly, with each packet having equal chance of being selected. Users not receiving an acknowledgement-by reflection, after one round-trip propagation delay, know that their packet was not selected and that it needs to be transmitted at a later time. In order to maintain the proper first-in, first-out (FIFO) packet sequence, achieve high-speed operation, and also associate the acknowledgements with the appropriate packet transmissions, a queueing arrangement can be used. As packets are generated by data generator 88, they are routed to FIFO buffers 99 based on their destination address. The buffers are served in a fixed, periodic pattern to ensure that a packet's acknowledgement—if that packet is selected, will be received by the user before the next transmission attempt to that same destination. Once an acknowledgement is received, the packet at the head of the FIFO can be deleted. A timer or counter at each FIFO monitors the time elapsed since the packet was transmitted.

The computation of the maximum achievable throughput (i.e., sytem capacity) is similar to known input-queued packet switch. Assuming a single receiver per output port, and a large number of input/output ports, the sytem capacity is given by the solution to the following quadratic equation:

$$(1-p) = p^2 / 2 \times (1-p)$$

Figure 4:
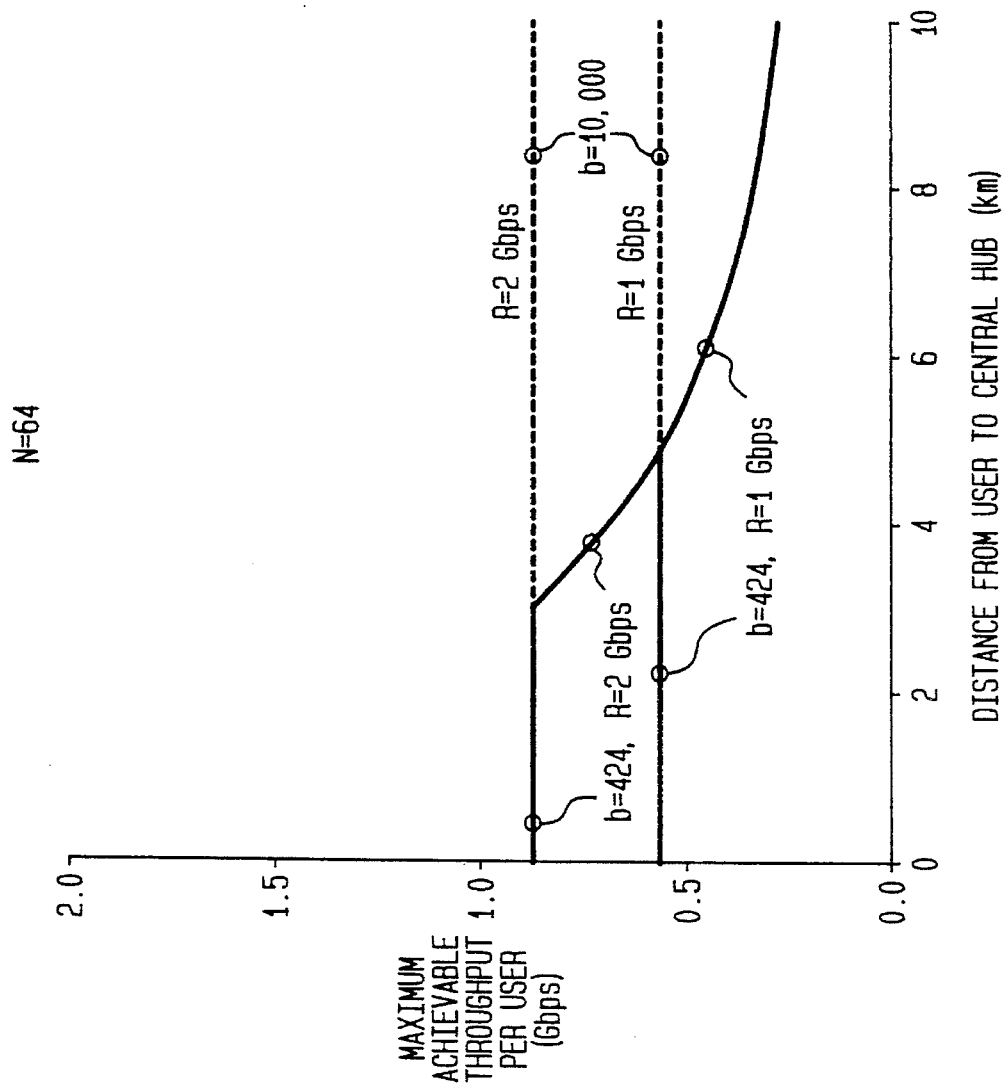
FIG. 4 shows the maximum achievable throughput per user with one receiver per user.

Solving this equation yields a maximum acievable throughput of 0.58 per WDM channel. However, if the propagation delay between the users and the central hub is sufficiently large, then this throughput cannot be achieved and still guarantee FIFO packet sequence. Assuming all users are an equal distant D from the hub, then the throughput per user is at most $((N \times b \times s)/2 \times D)$. In this expression, b represents the number of bits per packet, and s represents the speed of light in fiber $(2 \times 10^8 m/s)$. It's a bound on the throughput because a user can transmit at most N packets, one to each output port, per round-trip delay. With N=64 users, FIG. 4 shows the system capacity as a function of the distance, D, for various packet sizes, b (a long 10,000-bit packet and a short 424-bit ATM cell) and transmission rates R. For simplicity, we neglect the small laser tuning times, which will lower the capacity slightly. With 424-bit ATM cells, note that the throughput per user begins to fall off, due to the wasted time waiting for acknowledgements, as the distance from the user to the central hub increases above 3 km and 5 km for 2-Gbps and 1-Gbps transmission rates, respectively. With 10,000-bit packets, the maximum achievable throughput remains constant for distances up to 10 km shown in FIG. 4.

Figure 5:
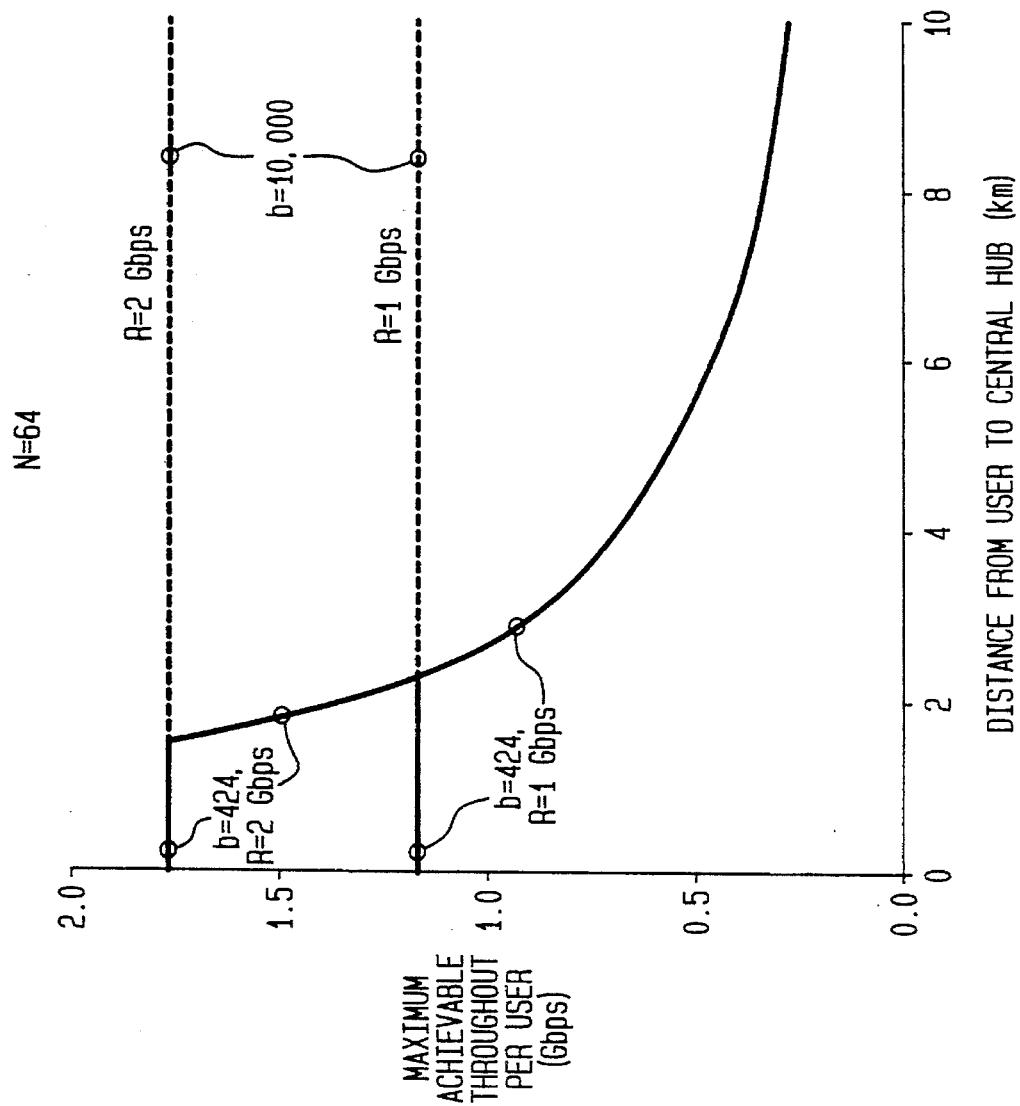
FIG. 5 shows the maximum achievable throughput per user with two receivers per user.

To increase the achievable throughput per user, suppose two of the fast-tunable optical filters are located at each output port (with a power splitter bewteen the frequency router and the two filters), and the filters select different packets when two or more are transmitted in a time slot. Two fibers will then carry the two selected packets to the user. FIG. 5 shows that significant capacity improvement is possible by increasing the number of receivers per output port from one to two (compare FIG. 5 with FIG. 4). Further improvements are possible by adding more receivers at each output port, but the diminishing throughput improvements are probably not worth the additional cost and control complexity. Using standard analysis, we obtain the two-receiver maximum capacity of 0.88 per WDM channel. Hence, for the two-receiver configurations, FIG. 5 shows a maximum achievable throughput per user of:

$$\min\{.88 \times R, [N \times b \times s / 2 \times D]\},$$

where R denotes the transmission rate per WDM channel.

In summary, an invention involving an optical packet communication system well suited for LAN and optical switching applications requiring high bit rate transmission has been described. The system provides collision-free reception by means of a novel fast-tunable optical filter that controls the packet flow. It uses a novel efficient scheme for reception acknowledgement. Its throughput can approach ninety perecnt.

Obviously, numerous modifications and variations of the present invention are possible in light of the above teachings. It is therefore understood that within the scope of the appended claims, the invention may be practiced otherwise than as specifically described herein.

What is claimed is:

1. A large capacity multi-access wavelength division multiplexing packet network comprising:

a hub having an N×N frequency router with a plurality of output ports, each having a pair of fibers connecting users to the hub for reception and transmission and a fast-tunable optical filter;

and a plurality of fast-tunable lasers; each being connected to said hub through a corresponding fiber and each for switching at nanosecond speeds at a distinct wavelength between N wavelengths of a system.

2. The network of claim 1, wherein the fast-tunable optical filter comprises means for detecting incoming packets.

3. The network of claim 2, wherein the fast-tunable optical filter further comprises means for selecting a packet when more than one packet tries to reach a same destination.

4. The network of claim 3, wherein the fast-tunable optical filter further comprises means for acknowledging reception of said packet.

5. The network of claim 3, wherein the means for selecting are active sections of optical waveguide.

6. The network of claim 4, wherein the means for acknowledging is based on a reflection signal of a fraction of the packet.

7. The network of claim 6, wherein the reflection signal is achieved by a optical waveguide discontinuity and by transmission reciprocity, such that the reflected signal flows back only to its source.

8. A large capacity multi-access wavelength division multiplexing packet network that is optically transparent between input and output ports comprising:

a central hub having an N×N frequency router with output ports;

fast-tunable optical filters located, respectively, at each of said output ports;

a plurality of first and second fibers for connecting users to the central hub, the first fibers used for user reception; and the second fibers used for user transmission, said transmission accomplished by a plurality of fast-tunable lasers connected to the hub through respective second fibers, each of the lasers for switching at nanosecond speeds at a distinct wavelength between N wavelengths of a system.

9. The network of claim 8, wherein the fast-tunable optical filters comprise means for detecting incoming packets.

10. The network of claim 9, wherein the fast-tunable optical filters further comprise means for selecting a packet when more than one packet tries to reach a same destination.

11. The network of claim 10, wherein the fast-tunable optical filters further comprise means for acknowledging reception of said packet.

12. The network of claim 10, wherein the means for acknowledging is based on a reflection signal of a fraction of the packet.

13. The network of claim 12, wherein the reflection signal is achieved by an optical waveguide discontinuity and by transmission reciprocity, such that the reflected signal flows back only to its source.

14. The network of claim 8, wherein at least one fast-tunable optical filters are located, respectively, at each of said output ports to increase the achievable throughput per user.

* * * * *